US012627882B2

(12) United States Patent

Hu et al.

(10) Patent No.: US 12,627,882 B2

(45) Date of Patent: May 12, 2026

(54) REDUCING EFFECTS OF LIGHT DIFFRACTION IN UNDER DISPLAY CAMERA (UDC) SYSTEMS

(71) Applicant: Samsung Electronics Co., Ltd., Suwon-si (KR)

(72) Inventors: Jinhan Hu, Little Elm, TX (US); Jing Li, Allen, TX (US); Chengyu Wang, Plano, TX (US); Pavan C. Madhusudanarao, Plano, TX (US); Hamid R. Sheikh, Allen, TX (US); John Seokjun Lee, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 127 days.

(21) Appl. No.: 18/477,293

(22) Filed: Sep. 28, 2023

(65) Prior Publication Data

US 2025/0113097 A1      Apr. 3, 2025

(51) Int. Cl.
  *H04N 23/60*        (2023.01)
  *G06T 7/32*         (2017.01)
          (Continued)

(52) U.S. Cl.
  CPC ............... *H04N 23/64* (2023.01); *G06T 7/32* (2017.01); *H04N 23/6845* (2023.01);
          (Continued)

(58) Field of Classification Search
  CPC .. H04N 23/64; H04N 23/6845; H04N 23/951; G06T 7/32; G06T 2207/10016; G06T 2207/20221
  See application file for complete search history.

(56) References Cited

U.S. PATENT DOCUMENTS

| | | | |
|---|---|---|---|
| 824,937 | A | 7/1906 | Kimpler |
| 10,176,558 | B2 | 1/2019 | Uliyar et al. |

(Continued)

FOREIGN PATENT DOCUMENTS

| | | |
|---|---|---|
| JP | 2007027815 A | 2/2007 |
| KR | 20220005600 A | 1/2022 |

(Continued)

OTHER PUBLICATIONS

International Search Report and Written Opinion of the International Searching Authority dated Oct. 18, 2024 in connection with International Patent Application No. PCT/KR2024/010368, 10 pages.

(Continued)

*Primary Examiner* — Christopher K Peterson

(57)        ABSTRACT

A method includes obtaining, using at least one under display camera, one or more first image frames associated with a first diffraction pattern and one or more second image frames associated with a second diffraction pattern. The first diffraction pattern and the second diffraction pattern are related through a transformation. The method also includes generating a first deblurred image using the one or more first image frames and a second deblurred image using the one or more second image frames. The method further includes combining the first and second deblurred images while exploiting complementary types of image artifacts created by the first and second diffraction patterns to generate an image of a scene.

20 Claims, 7 Drawing Sheets

(51) Int. Cl.
*H04N 23/68* (2023.01)
*H04N 23/951* (2023.01)

(52) U.S. Cl.
CPC . *H04N 23/951* (2023.01); *G06T 2207/10016*
(2013.01); *G06T 2207/20221* (2013.01)

(56) References Cited

U.S. PATENT DOCUMENTS

| | | | |
|---|---|---|---|
| 11,460,894 B2 | 10/2022 | Cha et al. | |
| 11,516,374 B2 | 11/2022 | Gove | |
| 11,727,540 B2 | 8/2023 | Tong et al. | |
| 2007/0013795 A1 | 1/2007 | Sakamoto et al. | |
| 2010/0080487 A1 | 4/2010 | Yitzhaky et al. | |
| 2017/0352136 A1 | 12/2017 | Uliyar et al. | |
| 2017/0358061 A1 | 12/2017 | Choi et al. | |
| 2021/0074012 A1* | 3/2021 | Fang | G06V 20/653 |
| 2021/0368081 A1 | 11/2021 | Kim et al. | |
| 2022/0392036 A1* | 12/2022 | Feng | G06V 10/44 |
| 2023/0028315 A1 | 1/2023 | Shukla et al. | |
| 2023/0053084 A1 | 2/2023 | Xu et al. | |
| 2024/0357899 A1* | 10/2024 | Zhu | H04N 23/50 |

FOREIGN PATENT DOCUMENTS

| | | |
|---|---|---|
| KR | 20220097818 A | 7/2022 |
| KR | 20230018957 A | 2/2023 |
| WO | 2022093294 A1 | 5/2022 |
| WO | 2022235785 A1 | 11/2022 |

OTHER PUBLICATIONS

Rublee et al., "ORB: an efficient alternative to SIFT or SURF," 2011 International Conference on Computer Vision, Nov. 2011, 8 pages.
Xiang et al., "Image stitching by line-guided local warping with global similarity constraint," Pattern Recognition, vol. 83, 2018, 17 pages.
Fischler et al., "Random Sample Consensus: A Paradigm for Model Fitting with Applications to Image Analysis and Automated Cartography," Graphics and Image Processing, Communications of The ACM, 1981, 15 pages.
Klein et al., "elastix: A Toolbox for Intensity-Based Medical Image Registration," IEEE Transactions On Medical Imaging, vol. 29, No. 1, Jan. 2010, 10 pages.
"OpenCV: Feature Matching with FLANN," Aug. 2023, 6 pages.

* cited by examiner

REDUCING EFFECTS OF LIGHT DIFFRACTION IN UNDER DISPLAY CAMERA (UDC) SYSTEMS

TECHNICAL FIELD

This disclosure relates generally to imaging systems. More specifically, this disclosure relates to reducing the effects of light diffraction in under display camera (UDC) systems.

BACKGROUND

Various electronic devices represent "full screen" devices in which most or all of the user-facing surfaces of the electronic devices are display panels. For example, many mobile electronic devices, such as smartphones and tablet computers, include front surfaces that are occupied almost entirely by display panels. Under display cameras (UDCs) are a key enabler for full-screen electronic devices and other electronic devices. In a UDC system, a digital camera is positioned underneath a semi-transparent organic light-emitting diode (OLED) display panel or other display panel. This generally hides the digital camera from the view of a user so that the user can only see the display panel.

SUMMARY

This disclosure relates to reducing the effects of light diffraction in under display camera (UDC) systems.

In a first embodiment, a method includes obtaining, using at least one under display camera, one or more first image frames associated with a first diffraction pattern and one or more second image frames associated with a second diffraction pattern. The first diffraction pattern and the second diffraction pattern are related through a transformation. The method also includes generating a first deblurred image using the one or more first image frames and a second deblurred image using the one or more second image frames. The method further includes combining the first and second deblurred images while exploiting complementary types of image artifacts created by the first and second diffraction patterns to generate an image of a scene.

In a second embodiment, an electronic device includes a display and at least one under display camera positioned under the display. The electronic device also includes at least one processing device configured to obtain, using the at least one under display camera, one or more first image frames associated with a first diffraction pattern and one or more second image frames associated with a second diffraction pattern. The first diffraction pattern and the second diffraction pattern are related through a transformation. The at least one processing device is also configured to generate a first deblurred image using the one or more first image frames and a second deblurred image using the one or more second image frames. The at least one processing device is further configured to combine the first and second deblurred images while exploiting complementary types of image artifacts created by the first and second diffraction patterns to generate an image of a scene.

In a third embodiment, a non-transitory machine readable medium contains instructions that when executed cause at least one processor of an electronic device to obtain, using at least one under display camera, one or more first image frames associated with a first diffraction pattern and one or more second image frames associated with a second diffraction pattern. The first diffraction pattern and the second diffraction pattern are related through a transformation. The non-transitory machine readable medium also contains instructions that when executed cause the at least one processor to generate a first deblurred image using the one or more first image frames and a second deblurred image using the one or more second image frames. The non-transitory machine readable medium further contains instructions that when executed cause the at least one processor to combine the first and second deblurred images while exploiting complementary types of image artifacts created by the first and second diffraction patterns to generate an image of a scene.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HND), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a gaming console (such as an XBOX, PLAYSTATION, or NINTENDO), a smart speaker or speaker with an integrated digital assistant (such as SAMSUNG GALAXY HOME, APPLE HOMEPOD, or AMAZON ECHO), an electronic dictionary, an electronic key, a camcorder, or an electronic picture frame.

Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
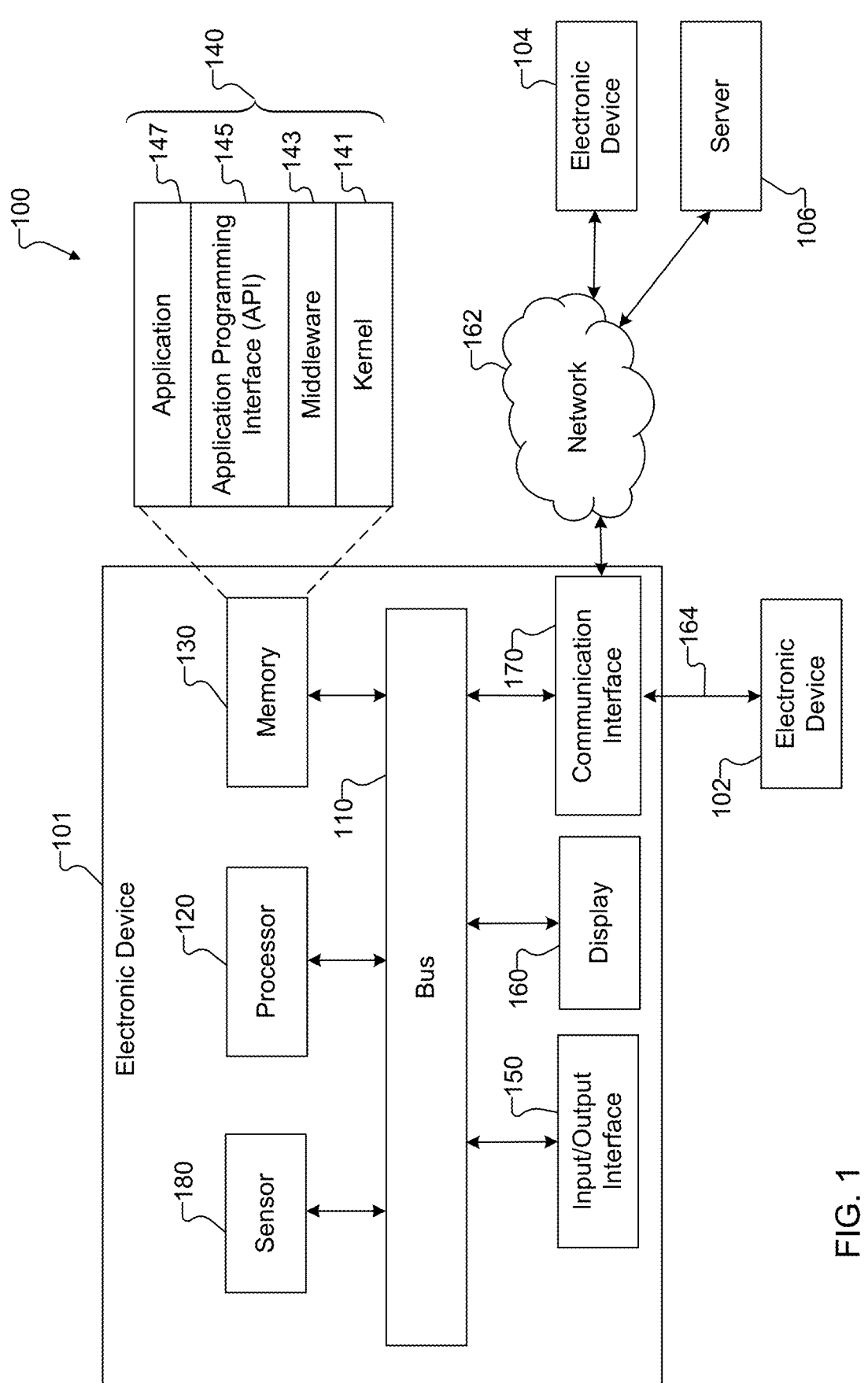
FIG. 1 illustrates an example network configuration including an electronic device in accordance with this disclosure.

FIGS. 1 through 9, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, various electronic devices represent "full screen" devices in which most or all of the user-facing surfaces of the electronic devices are display panels. For example, many mobile electronic devices, such as smartphones and tablet computers, include front surfaces that are occupied almost entirely by display panels. Under display cameras (UDCs) are a key enabler for full-screen electronic devices and other electronic devices. In a UDC system, a digital camera is positioned underneath a semi-transparent organic light-emitting diode (OLED) display panel or other display panel. This generally hides the digital camera from the view of a user so that the user can only see the display panel.

Unfortunately, the positioning of a digital camera underneath a display panel typically creates a number of issues in images that are captured using the digital camera. For example, the periodic pattern of an OLED display panel or other display panel and a limited amount of light that can be transmitted through the display panel can create various artifacts in images captured using a UDC system, such as noise and light diffraction artifacts. This can significantly reduce the overall image quality (IQ) of the resulting images, which can lower user satisfaction. Some approaches make extensive efforts to tune display panels in order to balance the tradeoff between image quality and the visibility of an under display camera. However, these approaches can still suffer from various problems, such as low signal-to-noise ratios (SNRs), significant light source diffraction artifacts, and low resolution.

This disclosure provides various techniques for reducing the effects of light diffraction in UDC systems. As described in more detail below, one or more first image frames associated with a first diffraction pattern and one or more second image frames associated with a second diffraction pattern can be obtained using at least one under display camera. The first diffraction pattern and the second diffraction pattern can relate to the periodic pattern(s) of an OLED display panel or other display panel positioned over the at least one under display camera. The first diffraction pattern and the second diffraction pattern can be related to one another through a transformation, such as when the second diffraction pattern represents a rotated version of the first diffraction pattern. First and second deblurred images can be respectively generated using the first and second image frames, such as by applying multi-frame processing to a sequence of first image frames and multi-frame processing to a sequence of second image frames in order to produce blended or other processed images and applying point spread function inversion to the processed images in order to produce the deblurred images. The first and second deblurred images can be combined while exploiting complementary types of image artifacts created by the first and second diffraction patterns to generate an image of a scene. For instance, the deblurred images may be merged by (i) performing an alignment operation in order to generate aligned versions of the deblurred images and (ii) merging the aligned versions of the deblurred images.

In this way, a UDC system is able to generate deblurred images of a scene using different image frames, where the different image frames can be captured using different diffraction patterns associated with a display. In some cases, the different image frames may also be captured from different viewing angles. This results in the creation of complementary types of image artifacts within the deblurred images. The different diffraction patterns used to obtain the image frames can be achieved in various ways, such as by rotating at least one under display camera, rotating at least a portion of a display relative to the at least one under display camera, integrating different grid patterns into the display, and/or rotating an electronic device that includes the display and the at least one under display camera. The complementary nature of the artifacts within the deblurred images can be exploited in the merging process in order to improve the final image quality of the resulting image. This can be achieved since the different deblurred images can have different light responses when different diffraction patterns are used (and possibly when facing a light source from different angles), so image quality can be improved (often times significantly) by combining the deblurred images having the different light responses. As a result, the overall images generated using these techniques can have improved signal-to-noise ratios, less light source diffraction artifacts, and/or improved resolution.

Note that while some of the embodiments discussed below are described in the context of use in specific types of consumer electronic devices (such as smartphones), this is merely one example. It will be understood that the principles of this disclosure may be implemented in any number of other suitable contexts and may use any suitable device or devices. Also note that while various embodiments discussed below are described based on the assumption that a single device receives and processes image frames in order to generate images of scenes, this is also merely one example. It will be understood that the principles of this disclosure may be implemented using any number of devices, including one device that captures image frames and another device that processes the image frames. In general, this disclosure is not limited to use with any specific type(s) of device(s).

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may be used to obtain multiple image frames from one or more under display cameras and process the image frames to generate final images of scenes while reducing the effects of light diffraction.

The memory 130 can include a volatile and/or nonvolatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for receiving and processing image frames while reducing the effects of light diffraction. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors, which may be used to capture images of scenes. The one or more cameras or other imaging sensors include one or more under display cameras, which represent one or more imaging sensors that are positioned under at least one display 160 and that capture illumination passing through the at least one display 160. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to obtain multiple image frames from one or more under display cameras and process the image frames to generate final images of scenes while reducing the effects of light diffraction.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
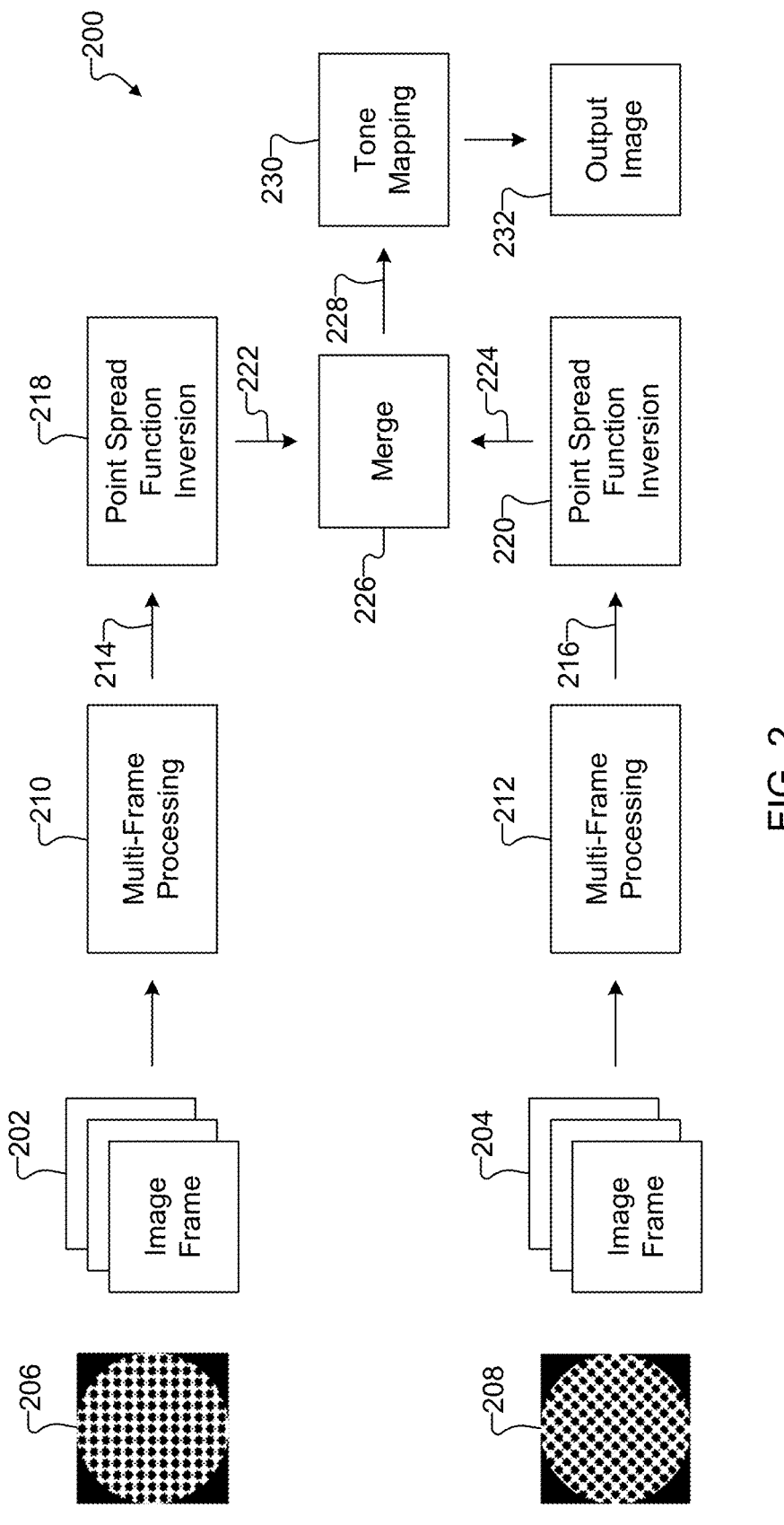
FIG. 2 illustrates an example architecture for reducing the effects of light diffraction in an under display camera (UDC) system in accordance with this disclosure.

FIG. 2 illustrates an example architecture 200 for reducing the effects of light diffraction in a UDC system in accordance with this disclosure. For ease of explanation, the architecture 200 shown in FIG. 2 is described as being implemented on or supported by the electronic device 101 in the network configuration 100 of FIG. 1. However, at least part of the architecture 200 shown in FIG. 2 could be used with any other suitable device(s) and in any other suitable system(s), such as when at least part of the architecture 200 is implemented on or supported by the server 106.

As shown in FIG. 2, the architecture 200 generally receives and processes different image frames 202 and 204. In some cases, a single image frame 202 and a single image frame 204 may be obtained and processed. In other cases, a sequence of two or more image frames 202 may be obtained and processed, and/or a sequence of two or more image frames 204 may be obtained and processed. Each of the image frames 202 and 204 may be obtained using at least one camera or other imaging sensor 180 of the electronic device 101 during an image capture operation, where the at least one camera or other imaging sensor 180 includes one or more under display cameras. Depending on the implementation, the different image frames 202 and 204 may be obtained using the same under display camera(s), or the different image frames 202 and 204 may be obtained using different under display cameras. Each image frame 202 or 204 can have any suitable resolution and format, such as a Bayer or other raw image format, a red-green-blue (RGB) image format, or a luma-chroma (YUV) image format. In the following discussion, it may often be assumed that multiple image frames 202 in a sequence may be obtained and processed and that multiple image frames 204 in a sequence may be obtained and processed. However, this is for illustration and explanation only.

In some embodiments, each sequence of image frames 202 and 204 may include two or more image frames captured using different capture conditions. The capture conditions can represent any suitable settings of the electronic device 101 or other device used to capture the image frames 202, 204 or any suitable contents of scenes being imaged. For example, the capture conditions may represent different exposure settings of the imaging sensor(s) 180 used to capture the image frames 202 or 204, such as different exposure times or ISO settings. In multi-frame processing pipelines, for instance, multiple image frames 202 or 204 can be captured using different exposure settings so that portions of different image frames 202 or 204 can be combined to produce a high dynamic range (HDR) output image or other blended image. The image frames 202 or 204 can also have different image contents when capturing dynamic scenes.

In this example, one or more image frames 202 are captured using a first diffraction pattern 206, and one or more image frames 204 are captured using a second diffraction pattern 208. The diffraction patterns 206 and 208 represent patterns contained in the display(s) 160 positioned above the under display camera(s) or other imaging sensor(s) 180 used to capture the image frames 202 and 204. Each diffraction pattern 206 and 208 can be formed by elements of an OLED display panel or other display 160 positioned above the under display camera(s) or other imaging sensor(s) 180 used to capture image frames. For instance, it is common for display panels (such as OLED display panels or other displays) to include wires, repetitive or periodic structures (such as light emitting diodes), and other components that are used to generate illumination. These components can partially block some of the light passing through a display panel and can create diffraction in the light that does pass through the display panel. This type of diffraction is very difficult to avoid using optical techniques.

As described below, processing operations can be used to reduce diffraction artifacts in blended or other processed images generated using the image frames 202 and 204. For example, artifacts caused by diffraction in the architecture 200 can be substantially reduced or minimized by using different diffraction patterns 206 and 208 to capture different image frames 202 and 204. That is, the image frame(s) 202 can be captured using the diffraction pattern 206, and the image frame(s) 204 can be captured using the diffraction pattern 208. The diffraction patterns 206 and 208 are different from one another but are related via a specified transformation. In other words, there is a known relationship or transformation that can be used to define how the diffraction pattern 208 relates to the diffraction pattern 206 (or vice versa). For instance, the diffraction pattern 208 may represent a rotated version of the diffraction pattern 206, in which case the specified transformation is a rotation of the diffraction pattern 206. As described below, the use of different diffraction patterns 206 and 208 when capturing different image frames 202 and 204 allows the image frames 202 and 204 (and blended or other processed images generated using the image frames 202 and 204) to have complementary types of image artifacts. As an example, spikes created around a light source may extend in certain directions in image frames 202 captured using the diffraction pattern 206 and may extend in different directions in image frames 204 captured using the diffraction pattern 208. These complementary types of image artifacts can be used as described below to reduce or minimize the presence of these image artifacts in final images of scenes generated using the image frames 202 and 204.

In this example, a sequence of image frames 202 is provided to a multi-frame processing (MFP) operation 210, which generally operates to blend or otherwise combine the contents of the image frames 202. Similarly, a sequence of image frames 204 is provided to a multi-frame processing operation 212, which generally operates to blend or otherwise combine the contents of the image frames 204. For example, each of the multi-frame processing operations 210, 212 can process the associated sequence of image frames 202 or 204 in order to determine how the image frames 202 or 204 can be blended in order to produce a blended or other processed image 214 or 216. In this example, the multi-frame processing operation 210 can generate the processed image 214 by combining the sequence of image frames 202, and the multi-frame processing operation 212 can generate the processed image 216 by combining the sequence of image frames 204. Each processed image 214 or 216 may represent an HDR image or other image that has improved characteristics relative to the individual image frames 202 or 204. Each multi-frame processing operation 210, 212 can include any suitable logic used to blend or otherwise combine multiple image frames. Note that if a single image frame 202 or 204 is obtained, the multi-frame processing operation 210 or 212 (or both) may be replaced by other image processing functionality that processes the image frame 202 or 204 and generates a processed image 214 or 216.

The processed images 214, 216 from the multi-frame processing operations 210, 212 are respectively provided to point spread function inversion (PSFI) operations 218, 220. Each of the PSFI operations 218, 220 generally operates to partially remove diffraction artifacts from the associated processed image 214 or 216. Each PSFI operation 218, 220 can therefore receive a processed image 214 or 216 and operate to produce a sharper or deblurred image 222 or 224. Each of the PSFI operations 218, 220 includes any suitable logic for generating deblurred (less blurry) images based on incoming images. In some embodiments, for instance, each of the PSFI operations 218, 220 may be implemented using a neural network that has been trained to receive blurred images and generate sharper images.

The deblurred images 222 and 224 are provided to a merge operation 226, which generally operates to combine the contents of the deblurred images 222 and 224 in order to generate an image 228 of a scene. For example, the merge operation 226 may process one or more of the deblurred images 222 and 224 in order to align the deblurred images 222 and 224 and generate aligned versions of the deblurred images 222 and 224. The merge operation 226 may also combine or merge the contents of the aligned versions of the deblurred images 222 and 224. Various techniques for merging the contents of the aligned versions of the deblurred images 222 and 224 may be available, and the specific technique or techniques used may be based on one or more specific factors or criteria. As particular examples, averaging, weighted averaging, or minimization may be used when merging the contents of the aligned versions of the deblurred images 222 and 224, and details of these example techniques are provided below. Depending on the implementation, the same merging technique may be used to combine all portions of the deblurred images 222 and 224, or different merging techniques may be used to combine different portions of the deblurred images 222 and 224. In some cases, the particular merging technique(s) applied may be based on one or more statistics associated with the deblurred images 222 and 224 or portions thereof. As explained below, due to the complementary nature of the image artifacts created by the use of the diffraction patterns 206 and 208 when capturing the image frames 202 and 204, the merging of the deblurred images 222 and 224 can help to reduce or minimize the presence of diffraction-based image artifacts in the image 228.

Any desired post-processing of the image 228 may be performed in order to generate a final image of a scene. For example, the image 228 may be provided to a tone mapping operation 230, which can be used to adjust colors in the image 228, in order to generate an output image 232. Tone mapping can be useful or important in various applications, such as when generating HDR images. For instance, since generating an HDR image often involves capturing multiple images of a scene using different exposures and combining the captured images to produce the HDR image, this type of processing can often result in the creation of unnatural tone within the HDR image. The tone mapping operation 230 can therefore use one or more color mappings to adjust the colors contained in the image 228. In some cases, this can be done so that the output image 232 can be displayed or otherwise presented in a form having a smaller dynamic range, such as when an HDR image is to be presented on a display device having a smaller dynamic range than the HDR image itself. The tone mapping operation 230 can include any suitable logic used to adjust tone in images, such as by using at least one lookup table to convert various colors in an image 228 into other colors in an output image 232.

Although FIG. 2 illustrates one example of an architecture 200 for reducing the effects of light diffraction in a UDC system, various changes may be made to FIG. 2. For example, various components and functions in FIG. 2 may be combined, further subdivided, replicated, or rearranged according to particular needs. Also, one or more additional components and functions may be included if needed or desired. Further, the image frames 202, 204 may be subjected to any desired pre-processing operation(s) prior to processing, and generated images 228 may be subjected to any desired post-processing operation(s) prior to generation of output images 232. In addition, while FIG. 2 illustrates various pairs of operations occurring in parallel (such as operations 210 and 212 or operations 218 and 220), other embodiments may perform a common operation sequentially multiple times in order to achieve the same or similar results.

Figure 3:
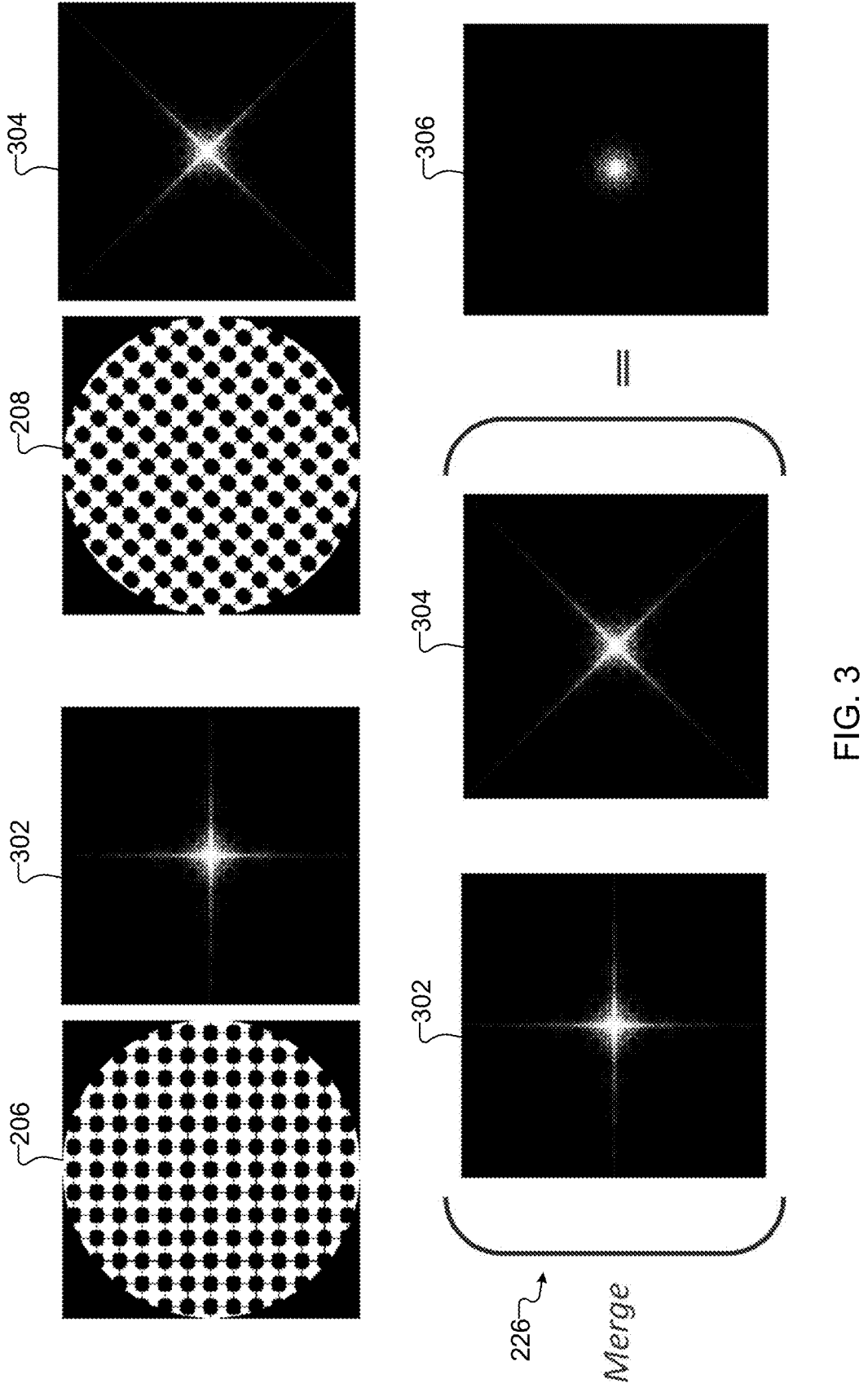
FIG. 3 illustrates example results obtained by reducing the effects of light diffraction in a UDC system using different diffraction patterns in accordance with this disclosure.

FIG. 3 illustrates example results obtained by reducing the effects of light diffraction in a UDC system using different diffraction patterns in accordance with this disclosure. More specifically, FIG. 3 illustrates how the architecture 200 of FIG. 2 may be used to generate image frames 202 and 204 using different diffraction patterns 206 and 208 and may use the image frames 202 and 204 to generate output images 232 having reduced or minimized diffraction artifacts.

As shown in FIG. 3, use of the diffraction pattern 206 may lead to the creation of certain diffraction artifacts, such as a diffraction artifact shown in image data 302. For example, in some cases, a display 160 positioned over an imaging sensor 180 (an under display camera) can have a pattern that functions as a binary aperture, and the binary aperture can produce a point spread function (PSF) that contains multiple spikes. This is clearly seen in the image data 302 illustrated in FIG. 3. Because of wires, light emitting diodes (LEDs), or other components of the display 160, the binary aperture contains multiple straight edges, and the spikes in the point spread function can be generally perpendicular to those edges. Similarly, use of the diffraction pattern 208 may lead to the creation of certain diffraction artifacts, such as a diffraction artifact shown in image data 304. Again, a display 160 positioned over an imaging sensor 180 can have a pattern that functions as a binary aperture, and the binary aperture can produce a point spread function that contains multiple spikes. Because of wires, LEDs, or other components of the display 160, the binary aperture contains multiple straight edges, and the spikes in the point spread function are generally perpendicular to those edges.

In the example shown in FIG. 3, however, the diffraction pattern 206 and the diffraction pattern 208 are not identical but are related in some manner, such as by a rotation in this specific example. That is, the diffraction pattern 208 may be formed by rotating the diffraction pattern 206. Because of this, the spikes of the diffraction artifacts in the image data 302 and 304 are not aligned with one another and are generally offset from each other in an angular manner. As a particular example, if the diffraction pattern 208 is rotated by about 45° relative to the diffraction pattern 206, the spikes of the diffraction artifact in the image data 304 can also be rotated by about 45° relative to the spikes of the diffraction artifact in the image data 302. When deblurred images 222 and 224 containing the image data 302 and 304 are merged by the merge operation 226, the misaligned spikes of the diffraction artifacts can be reduced or minimized in the resulting image 228. An example of this is shown in FIG. 3, where the merge operation 226 combines deblurred images 222 and 224 containing the diffraction artifacts of the image data 302 and 304 and produces an image 228 containing image data 306. As can be seen here, the image data 306 is much clearer and may contain little or no diffraction artifacts. In other words, by preventing the spikes of the diffraction artifacts in the deblurred images 222 and 224 from aligning with one another, the spikes can be significantly reduced or minimized in the resulting images 228 by the merge operation 226.

There are various ways in which the different diffraction patterns 206, 208 may be obtained when capturing the different image frames 202, 204. As an example, the image frames 202, 204 may be captured using one or more imaging sensors 180, and the one or more imaging sensors 180 may be rotatable. This may allow the imaging sensor(s) 180 to capture one or more image frames 202 using the diffraction pattern 206, the imaging sensor(s) 180 to be rotated, and the imaging sensor(s) 180 to capture one or more image frames 204 using the diffraction pattern 208. As another example, at least a portion of one or more displays 160 positioned above one or more imaging sensors 180 may be rotatable. This may allow the imaging sensor(s) 180 to capture one or more image frames 202 using the diffraction pattern 206, the display(s) 160 to be rotated, and the imaging sensor(s) 180 to capture one or more image frames 204 using the diffraction pattern 208. As yet another example, the image frames 202, 204 may be captured using different imaging sensors 180, and the different imaging sensors 180 may be positioned under different portions of one or more displays 160 having different diffraction patterns. This may allow the different imaging sensors 180 to capture the different image frames 202, 204 using the different diffraction patterns 206, 208. As still another example, the image frames 202, 204 may be captured using one or more imaging sensors 180, and the electronic device 101 itself may be rotated (such as by a user). This may allow the imaging sensor(s) 180 to capture one or more image frames 202 using the diffraction pattern 206, the electronic device 101 to be rotated, and the imaging sensor(s) 180 to capture one or more image frames 204 using the diffraction pattern 208. Note that these examples are for illustration only and that any other or additional mechanism(s) may be used to obtain different diffraction patterns 206, 208. Also note that any combination of these and/or other approaches may be used. In general, this disclosure is not limited to any specific technique or techniques for obtaining different diffraction patterns 206, 208.

As can be seen in these examples, it is possible to use various techniques or various combinations of techniques in order to achieve the desired diffraction patterns 206 and 208 used when capturing different image frames 202 and 204. Regardless of how the different diffraction patterns 206 and 208 are actually achieved, the end result is ideally the generation of multiple deblurred images 222 and 224 having complementary or substantially non-overlapping diffraction artifacts. This allows the multiple deblurred images 222 and 224 to be merged in a manner that reduces or minimizes the appearance of those diffraction artifacts in the generated images 228. As a result, the images 228 can have various desirable properties, such as improved signal-to-noise ratios, less light source diffraction artifacts, and/or improved resolution.

Although FIG. 3 illustrates one example of results obtained by reducing the effects of light diffraction in a UDC system using different diffraction patterns, various changes may be made to FIG. 3. For example, the specific diffraction artifacts and the specific reduction in the diffraction artifacts provided by merging are examples only. The actual diffraction artifacts present in images can vary widely based on (among other things) the specific scenes being imaged and the specific diffraction patterns used in one or more displays. Also, the specific reduction in the diffraction artifacts can vary widely based on (among other things) the specific techniques(s) used to merge image data.

Figure 4A:
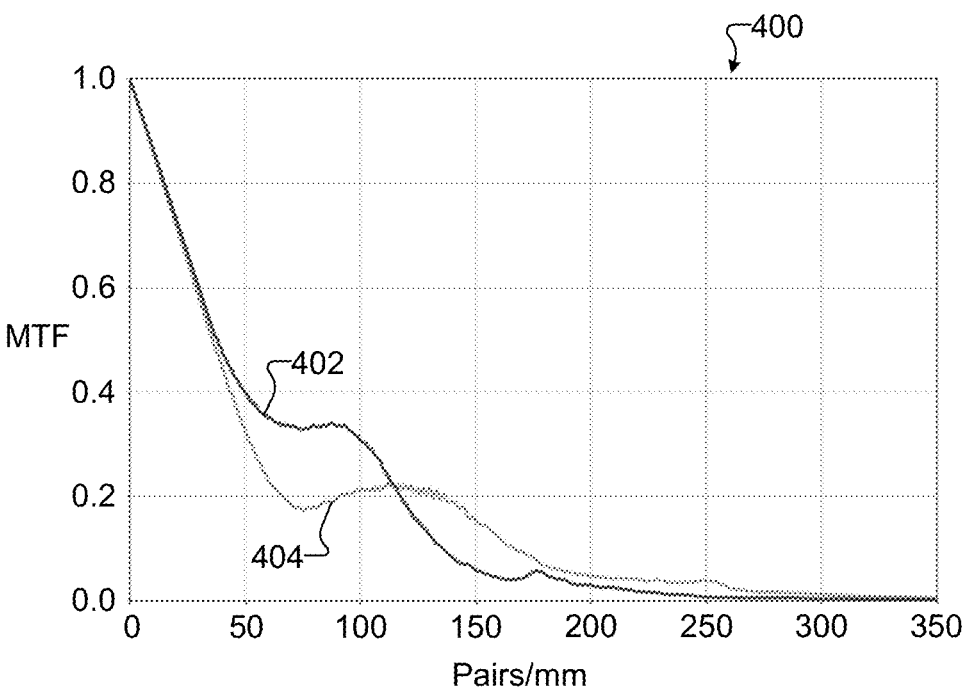
FIGS. 4A and 4B illustrate an example combination of modulation transfer functions associated with different diffraction patterns used with a UDC system in accordance with this disclosure.
Figure 4B:
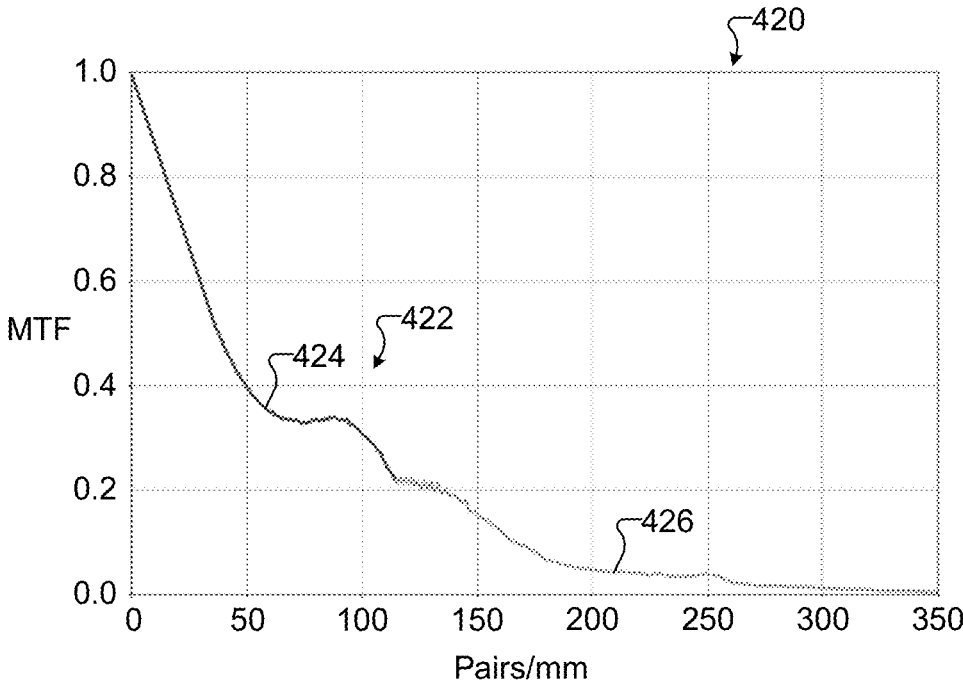

FIGS. 4A and 4B illustrate an example combination of modulation transfer functions associated with different diffraction patterns used with a UDC system in accordance with this disclosure. A modulation transfer function (denoted "MTF" in FIGS. 4A and 4B) curve can be used to characterize the resolution of an imaging system for different spatial frequencies (denoted "pairs/mm" in FIGS. 4A and 4B), where higher values indicate stronger resolving powers or higher resolutions. Higher resolutions may generally be preferable since this increases the quality of images produced by the imaging system.

As shown in FIG. 4A, a graph 400 contains curves 402 and 404 associated with different modulation transfer functions, where those modulation transfer functions are associated with different diffraction patterns 206 and 208. When a single under display camera or other imaging sensor 180 is considered, the resolution of the imaging sensor 180 follows a single MTF curve. However, because of the diffraction pattern positioned over the imaging sensor 180, the imaging sensor 180 can have different spatial resolutions in different orientations of the diffraction pattern. In FIG. 4A, for example, the curve 402 is associated with the modulation transfer function of an imaging sensor 180 when used with the diffraction pattern 206, and the curve 404 is associated with the modulation transfer function of the imaging sensor 180 when used with the diffraction pattern 208. As can be seen here, the imaging sensor 180 can have higher spatial resolutions at certain frequencies when used with the diffraction pattern 206 and higher spatial resolutions at other frequencies when used with the diffraction pattern 208.

Through the use of the architecture 200 (including the merge operation 226), it is possible to combine complementary portions of the modulation transfer functions as defined by the curves 402 and 404. An example of this is shown in FIG. 4B, where a graph 420 contains a curve 422 having two portions 424 and 426. More specifically, the portion 424 of the curve 422 may represent the portion of the curve 402 that is higher than the curve 404 in FIG. 4A, while the portion 426 of the curve 422 may represent the portion of the curve 404 that is higher than the curve 402 in FIG. 4A. In other words, the modulation transfer function defined by the curve 422 can include the higher-resolution portions of both curves 402 and 404. Once again, the complementary nature of the diffraction patterns 206 and 208 can be exploited by the merge operation 226, such as by combining (i) image data associated with the diffraction pattern 206 having higher spatial resolution and (ii) image data associated with the diffraction pattern 208 having spatial higher resolution. Effectively, the merge operation 226 can retain the higher-resolution portions of different deblurred images 222 and 224 when generating an image 228. Among other things, the image 228 can therefore be generated with reduced or minimized diffraction artifacts.

Although FIGS. 4A and 4B illustrate an example of a combination of modulation transfer functions associated with different diffraction patterns used with a UDC system, various changes may be made to FIGS. 4A and 4B. For example, the modulation transfer functions shown here are examples only and are merely meant to illustrate one example of how higher-resolution portions of different deblurred images 222 and 224 can be combined. The actual modulation transfer functions associated with the architecture 200 can vary widely based on (among other things) the implementation of the architecture 200.

Figure 5:
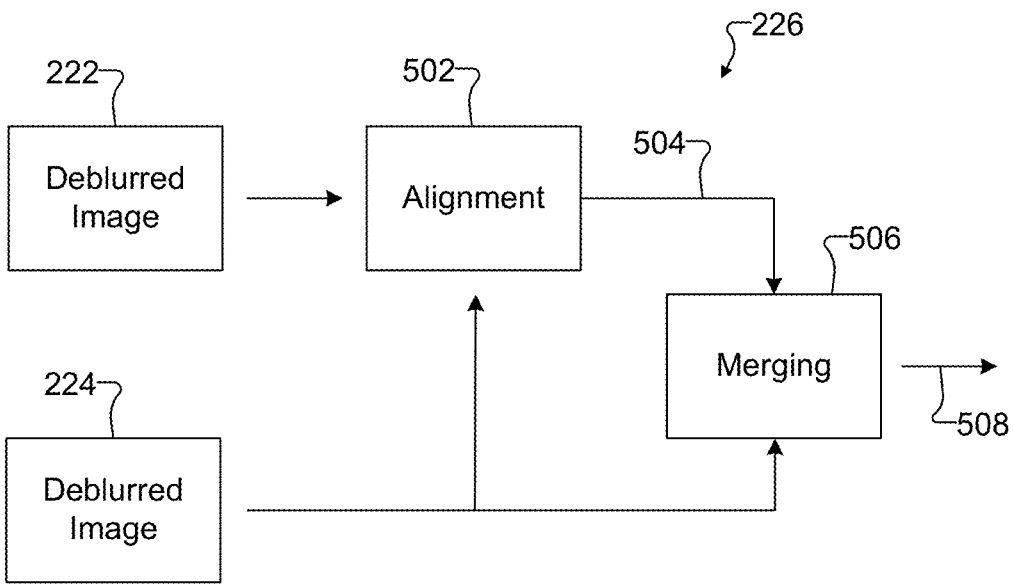
FIG. 5 illustrates an example merge operation in the architecture of FIG. 2 in accordance with this disclosure.

FIG. 5 illustrates an example merge operation 226 in the architecture 200 of FIG. 2 in accordance with this disclosure. As described above, the merge operation 226 can be used to combine the image data from deblurred images 222 and 224 in order to generate an image 228 of a scene. The deblurred images 222 and 224 may contain complementary diffraction artifacts associated with different diffraction patterns 206 and 208, and the merge operation 226 can combine the deblurred images 222 and 224 such that the resulting image 228 has reduced or minimized diffraction artifacts.

Figure 6:
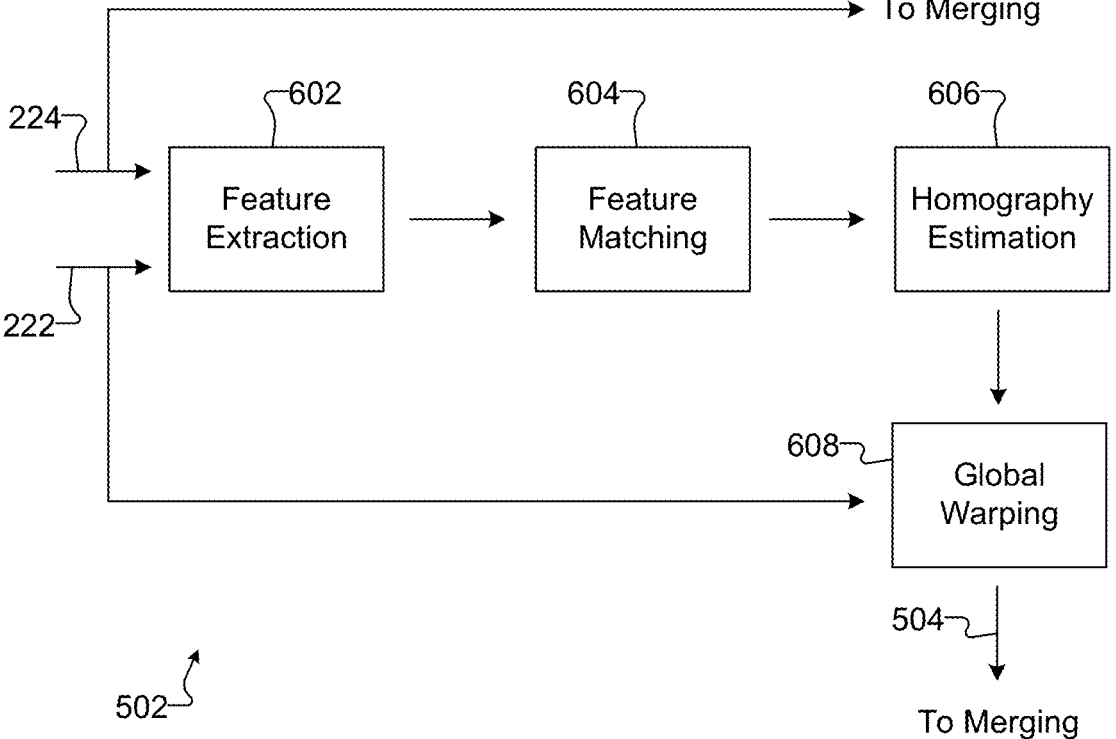
FIGS. 6 through 8 illustrate an example alignment function in the merge operation of FIG. 5 in accordance with this disclosure.
Figure 7:
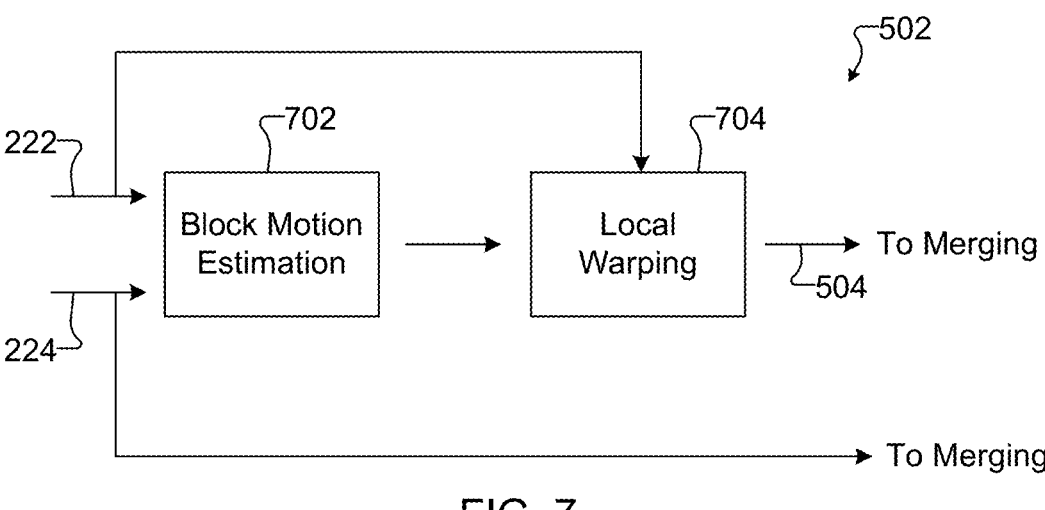
Figure 8:
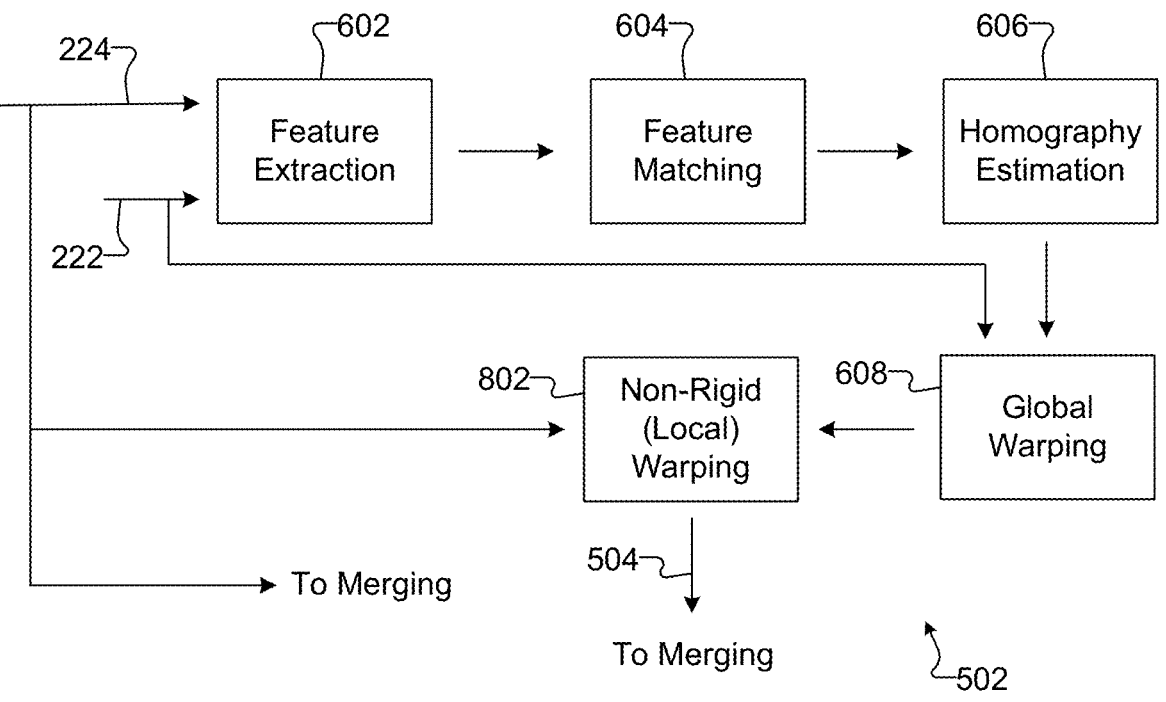

As shown in FIG. 5, the deblurred images 222 and 224 are provided to an alignment function 502, which generally operates to modify at least one of the deblurred images 222 and 224 in order to generate aligned versions of the deblurred images 222 and 224. In this example, the alignment function 502 modifies the deblurred image 222 in order to generate a modified deblurred image 504. The modified deblurred image 504 and the deblurred image 224 represent aligned versions of the deblurred images 222 and 224, meaning points in the modified deblurred image 504 are substantially aligned spatially with corresponding points in the deblurred image 224. Note that while the alignment function 502 here is shown as modifying only the deblurred image 222, the alignment function 502 may modify only the deblurred image 222 or modify both of the deblurred images 222 and 224 in order to generate the aligned versions of the deblurred images 222 and 224. The alignment function 502 can use various approaches, such as global alignment and/or local alignment, in order to generate the aligned versions of the deblurred images 222 and 224. Examples of various alignment techniques are shown in FIGS. 6 through 8, which are described below.

The aligned versions of the deblurred images 222 and 224 (the modified deblurred image 504 and the deblurred image 224 in this example) are provided to a merging function 506, which generally operates to combine the image data contained in the aligned versions of the deblurred images 222 and 224. The merging function 506 combines the image data in the aligned versions of the deblurred images 222 and 224 in order to generate an image 228 based on the deblurred images 222 and 224. The merging function 506 can use any suitable technique(s) to merge image data from multiple deblurred images. As noted above, for instance, averaging, weighted averaging, and/or minimization techniques may be used to combine image data.

Averaging of the image contents in the aligned versions of the deblurred images 222 and 224 can involve determining an average value for each pixel location within the image 228 based on the pixel values in the same pixel location within the aligned versions of the deblurred images 222 and 224. In some embodiments, the output of the merging function 506 can be defined as follows for averaging.

$$\text{Output} = (L + R)/2$$

Here, Output represents the value of a pixel in the image 228, and L and R respectively represent pixel values in the aligned versions of the deblurred images 222 and 224. In some cases, averaging of the image contents in the aligned versions of the deblurred images 222 and 224 may be used when obtaining a higher signal-to-noise ratio is desired.

Weighted averaging of the image contents in the aligned versions of the deblurred images 222 and 224 can involve determining a weighted average value for each pixel location within the image 228 based on the pixel values in the same pixel location within the aligned versions of the deblurred images 222 and 224, where different pixel values in different deblurred images can be weighted differently. For instance, the pixel values in different ones of the aligned versions of the deblurred images 222 and 224 can be pre-multiplied with weights before averaging. The weights can be selected to reflect the amount of information from each deblurred image 222 and 224 so that the resulting image 228 has less distortions compared to the individual deblurred images 222 and 224. As an example, among two deblurred images 222 and 224, if one contains more artifacts than the other, higher weights can be applied to the image with less distortions. In some embodiments, local contrast can be used as a weighting function, which means that the deblurred image 222 or 224 having a larger contrast in a specified region can have its pixel values in that region weighted more heavily compared to the pixel values in the deblurred image 224 or 222 having a smaller contrast. The local contrast may be determined in any suitable manner, such as by using a Laplacian filter. In some embodiments, the output of the merging function 506 can be defined as follows for weighted averaging.

$$Output = L * W_l + R * W_r$$

Here, Output represents the value of a pixel in the image 228, L and R respectively represent pixel values in the aligned versions of the deblurred images 222 and 224, and $W_l$ and $W_r$ respectively represent the weights applied to the pixel values in the aligned versions of the deblurred images 222 and 224. Often times, $W_l$ and $W_r$ are defined such that $W_l+W_r=1$. In some cases, weighted averaging may be used when obtaining a lower distortion is desired.

Minimization of the image contents in the aligned versions of the deblurred images 222 and 224 can involve selecting the value for each pixel location within the image 228 based on the smallest pixel value in the same pixel location within the aligned versions of the deblurred images 222 and 224. In some embodiments, the output of the merging function 506 can be defined as follows for minimization.

$$Output = min(L, R)$$

Here, Output represents the value of a pixel in the image 228, L and R respectively represent pixel values in the aligned versions of the deblurred images 222 and 224, and min( ) represents a function that selects the smaller of L and R. This approach may operate under the assumption that light source diffraction artifacts generally have large image intensities, so taking minimum pixel values at each location of the aligned versions of the deblurred images 222 and 224 can effectively remove the diffraction artifacts. In some cases, minimization of the image contents in the aligned versions of the deblurred images 222 and 224 may be used when removing diffraction artifacts is desired.

In some embodiments, multiple merging options can be provided in the architecture 200, and different merging options can be applied by the merging function 506 depending on the circumstances. For example, in some cases, the merging function 506 can select one of the merging options for use in merging the deblurred images 222 and 224 or one or more portions of the deblurred images 222 and 224 based on at least one image quality criterion. In particular embodiments, the merging function 506 can adaptively select different ones of the merging options on-the-fly, such as based on the image contents. Also, in particular embodiments, the merging function 506 may perform the various merging options using software or firmware code, so little or no hardware and memory overheads are incurred when multiple merging options are available for use. Note, however, that the architecture 200 may support a single merging option, support one or more other or additional merging options, or support any other suitable mechanism for switching between merging options.

Although FIG. 5 illustrates one example of a merge operation 226 in the architecture 200 of FIG. 2, various changes may be made to FIG. 5. For example, various components and functions in FIG. 5 may be combined, further subdivided, replicated, or rearranged according to particular needs. Also, one or more additional components and functions may be included if needed or desired. In addition, while the use of two deblurred images 222 and 224 is shown here, the architecture 200 may generate and the merge operation 226 may combine more than two deblurred images.

FIGS. 6 through 8 illustrate an example alignment function 502 in the merge operation 226 of FIG. 5 in accordance with this disclosure. As noted above, the alignment function 502 operates to modify at least one of multiple deblurred images 222 and 224 in order to generate aligned versions of the deblurred images 222 and 224. The aligned versions of the deblurred images 222 and 224 can subsequently be merged and used to generate an image 228 of a scene (ideally with reduced or minimized diffraction artifacts as discussed above).

As shown in FIG. 6, one example embodiment of the alignment function 502 performs global registration of the deblurred images 222 and 224 in order to generate aligned versions of the deblurred images 222 and 224. Here, the deblurred images 222 and 224 are provided to a feature extraction function 602, which generally operates to detect and describe distinctive features within each of the deblurred images 222 and 224. The identified features of the deblurred images 222 and 224 may relate, for instance, to certain objects captured in the deblurred images 222 and 224, such as features associated with people, vehicles, buildings, natural landmarks, or other contents of the deblurred images 222 and 224. The feature extraction function 602 may use any suitable technique(s) to perform feature identification and extraction using multiple images. In some embodiments, for example, the feature extraction function 602 may use one or more approaches described in Rublee et al., "ORB: An efficient alternative to SIFT or SURF," 2011 International Conference on Computer Vision, November 2011 (which is hereby incorporated by reference in its entirety) to extract features from the deblurred images 222 and 224, although other implementations of the feature extraction function 602 could be used.

The extracted features are provided to a feature matching function 604, which generally operates to match the identified features from different deblurred images 222 and 224 so that common features captured in multiple deblurred images 222 and 224 are identified as being the same features. For example, the feature matching function 604 may determine that one or more identified features associated with the same object in different deblurred images 222 and 224 represent the same features, such as when certain features correspond to the same features of people, vehicles, buildings, natural landmarks, or other contents of the deblurred images 222 and 224. The feature matching function 604 may use any suitable technique(s) to perform feature matching. In some embodiments, for instance, the feature matching function 604 can be implemented using a "Fast Library for Approximate Nearest Neighbors" or "FLANN" feature matcher in order to match features extracted from the deblurred images 222 and 224, although other implementations of the feature matching function 604 could be used.

The matched features are provided to a homography estimation function 606, which generally operates to estimate how one deblurred image 222 or 224 should be warped or otherwise transformed so that features in that deblurred image are positioned in the same or substantially the same locations as the same features in the other deblurred image 224 or 222. In some cases, the homography estimation function 606 can generate a perspective transformation matrix, which may define how the perspective of a scene as captured in one deblurred image 222 or 224 would need to be transformed in order to at least substantially match the perspective of the same scene as captured in the other deblurred image 224 or 222. The homography estimation function 606 may use any suitable technique(s) to generate a perspective transformation matrix or other transformation based on matched features. In some embodiments, for example, the homography estimation function 606 may use a "Random Sample Consensus" or "RANSAC" algorithm to generate a perspective transformation matrix based on matched features, although other implementations of the homography estimation function 606 could be used.

The deblurred image 222 and the perspective transformation matrix or other transform are provided to a global warping function 608, which generally operates to warp the deblurred image 222 based on the transform in order to generate the modified deblurred image 504. For example, the global warping function 608 can warp the deblurred image 222 based on the transform so that features in the modified deblurred image 504 are positioned in the same or substantially the same locations as the same features in the deblurred image 224. As a particular example, the global warping function 608 can warp the deblurred image 222 based on the perspective transformation matrix so that the perspective of the scene as defined by the modified deblurred image 504 matches or substantially matches the perspective of the scene as defined by the deblurred image 224. The global warping function 608 may use any suitable technique(s) to warp at least one image. In some embodiments, for instance, the global warping function 608 may perform bicubic interpolation in order to interpolate each pixel value based on the surrounding pixel values in a 4×4 or other grid, which leads to the generation of a warped image (namely the modified deblurred image 504 in this example) that is highly accurate and exhibits fewer artifacts. However, the global warping function 608 may use any other suitable warping technique(s).

As shown in FIG. 7, another example embodiment of the alignment function 502 performs local alignment of the deblurred images 222 and 224 in order to generate aligned versions of the deblurred images 222 and 224. Here, the deblurred images 222 and 224 are provided to a block motion estimation function 702, which generally operates to divide each of the deblurred images 222 and 224 into non-overlapping blocks. In some cases, the blocks of the deblurred images 222 and 224 can have fixed dimensions. The block motion estimation function 702 also identifies the most similar blocks between the deblurred images 222 and 224, such as by identifying one of the blocks of the deblurred image 222 that is most similar to one of the blocks of the deblurred image 224. In some embodiments, the most similar blocks can be identified using a grid search, where blocks in the deblurred images 222 and 224 at different displacements are evaluated using a suitable distance metric. The two blocks with the smallest distance (one in the deblurred image 222 and one in the deblurred image 224) are selected as the most similar blocks. Once the most similar blocks are identified, a local warping function 704 can be performed to locally warp each block based on the identified displacement (the smallest distance).

As shown in FIG. 8, yet another example embodiment of the alignment function 502 performs both global registration and local alignment of the deblurred images 222 and 224 in order to generate aligned versions of the deblurred images 222 and 224. Here, the deblurred images 222 and 224 are processed using the feature extraction function 602, the feature matching function 604, the homography estimation function 606, and the global warping function 608. This results in the generation of globally-aligned versions of the deblurred images 222 and 224 (namely the deblurred image 224 and the globally-warped version of the deblurred image 222 in this case), which are provided to a non-rigid warping function 802. The non-rigid warping function 802 can provide local warping of one or more of the globally-aligned versions of the deblurred images 222 and 224. In this example, the results of the global warping can be used to initialize the non-rigid local warping in order to accelerate the processing of the deblurred images 222 and 224. This type of approach can be useful when lens distortion and three-dimensional (3D) scenes prevent global registration from yielding good results by itself, in which case the non-rigid registration provided by the non-rigid warping function 802 can address this with a higher-dimensional parameter space. In some embodiments, various operations shown in FIG. 8 may be implemented as described in Klein et al., "elastix: A Toolbox for Intensity-Based Medical Image Registration," IEEE Transactions on Medical Imaging, Vol. 29, No. 1, January 2010 (which is hereby incorporated by reference in its entirety).

Although FIGS. 6 through 8 illustrate three examples of the alignment function 502 in the merge operation 226 of FIG. 5, various changes may be made to FIGS. 6 through 8. For example, various components and functions in each of FIGS. 6 through 8 may be combined, further subdivided, replicated, or rearranged according to particular needs. Also, one or more additional components and functions may be included in each of FIGS. 6 through 8 if needed or desired. In addition, deblurred images may be aligned in any other suitable manner and need not be aligned using any of the specific techniques shown in FIGS. 6 through 8.

Figure 9:
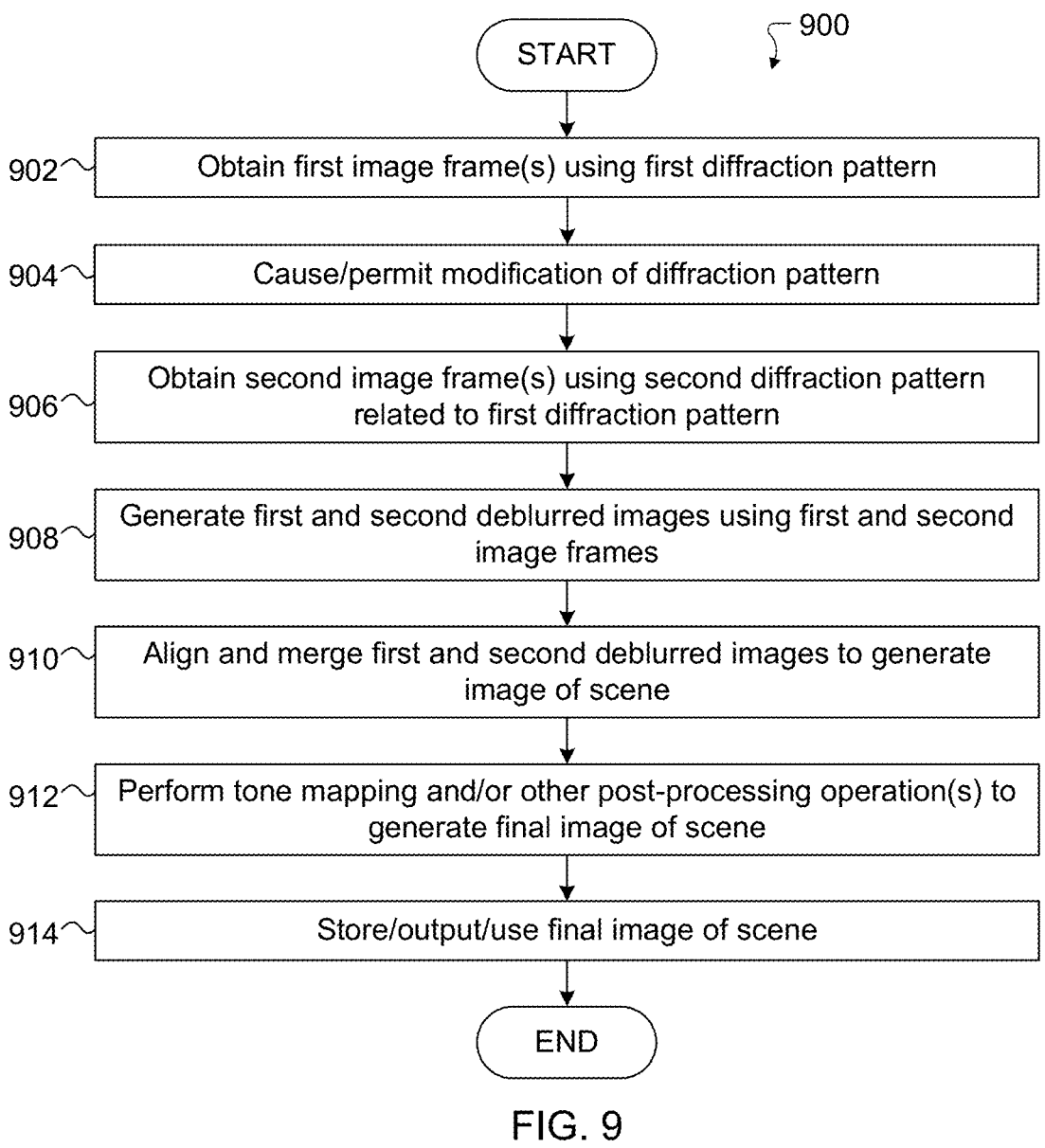
FIG. 9 illustrates an example method for reducing the effects of light diffraction in a UDC system in accordance with this disclosure.

FIG. 9 illustrates an example method 900 for reducing the effects of light diffraction in a UDC system in accordance with this disclosure. For ease of explanation, the method 900 shown in FIG. 9 is described as being performed by the electronic device 101 in the network configuration 100 of FIG. 1, where the electronic device 101 can implement the architecture 200 shown in FIG. 2. However, the method 900 shown in FIG. 9 could be performed by any other suitable device(s) and in any other suitable system(s), such as when the method 900 is performed using the server 106.

As shown in FIG. 9, one or more first image frames of a scene are obtained using a first diffraction pattern at step 902. The diffraction pattern can optionally be rotated or otherwise modified (or allowed to be rotated or otherwise modified) at step 904. One or more second image frames of the scene is obtained using a second diffraction pattern at step 906. This may include, for example, the processor 120 of the electronic device 101 obtaining one or more image frames 202 using one or more under display cameras or other imaging sensors 180 along with a first diffraction pattern 206. This may also include the processor 120 of the electronic device 101 obtaining one or more image frames 204 using one or more under display cameras or other imaging sensors 180 along with a second diffraction pattern 208. The second diffraction pattern 208 is different from but related to the first diffraction pattern 206 via a transformation, such as a rotation. As noted above, the same imaging sensor(s) 180 may or may not be used to obtain the image frames 202, 204, and one or more actions may or may not be needed to create the different diffraction patterns 206, 208. For instance, in some cases, the one or more image frames 202 may be captured by one or more imaging sensors 180 using the first diffraction pattern 206, and the second diffraction pattern 208 may be created (such as via rotation of the imaging sensor(s) 180, at least part of the display(s) 160 over the imaging sensor(s) 180, and/or the electronic device 101) prior to capturing the one or more image frames 204 using the same imaging sensor(s) 180. In other cases, the frames 202, 204 may be captured by different imaging sensors 180 using different diffraction patterns 206, 208, such as when the display(s) 160 over the imaging sensors 180 incorporate the different diffraction patterns 206, 208 in different areas of the display(s) 160.

First and second deblurred images are generated using the first and second image frames at step 908. This may include, for example, the processor 120 of the electronic device 101 performing the multi-frame processing operations 210, 212 or other image processing operations to process the image frames 202, 204 and generate processed images 214, 216. This may also include the processor 120 of the electronic device 101 performing the PSFI operations 218, 220 to process the processed images 214, 216 and generate deblurred images 222, 224. Each of the deblurred images 222, 224 generally represents a less blurry version of the associated processed image 214, 216.

The deblurred images are aligned and merged in order to generate an image of the scene at step 910. This may include, for example, the processor 120 of the electronic device 101 performing the merge operation 226 to combine the deblurred images 222, 224 while exploiting complementary types of image artifacts created by the first and second diffraction patterns 206, 208. In some cases, the alignment can be performed to generate aligned versions of the deblurred images 222, 224. In particular embodiments, the alignment can include a global registration operation that globally aligns the deblurred images 222, 224 (such as based on feature extraction and feature matching) and/or a local alignment operation that locally warps at least a portion of one deblurred image 222, 224 and locally aligns portions of the deblurred images 222, 224 (such as based on non-rigid warping). The merging can be performed to merge the aligned versions of the deblurred images 222, 224. In particular embodiments, the merging can use at least one merging operation that is selected based on an image quality criterion, and the image quality criterion may vary within different portions of the deblurred images 222, 224. Examples of merging operations that might be selected can include an averaging operation that is selected when the image quality criterion specifies obtaining a higher signal-to-noise ratio, a weighted averaging operation that is selected when the image quality criterion specifies obtaining a lower distortion, and/or a minimum operation that is selected when the image quality criterion specifies removing diffraction artifacts. In some cases, the weighting that is used in the weighted averaging operation can be based on local contrast within the deblurred images 222, 224.

One or more post-processing operations may optionally be performed to generate a final image of the scene at step 912. This may include, for example, the processor 120 of the electronic device 101 performing the tone mapping operation 230 in order to adjust colors in the image 228 and generate an output image 232. The final image of the scene is stored, output, or used in some manner at step 914. For example, the output image 232 may be displayed on a display 160 of the electronic device 101, saved to a camera roll stored in a memory 130 of the electronic device 101, or attached to a text message, email, or other communication to be transmitted from the electronic device 101. Of course, the output image 232 could be used in any other or additional manner.

Although FIG. 9 illustrates one example of a method 900 for reducing the effects of light diffraction in a UDC system, various changes may be made to FIG. 9. For example, while shown as a series of steps, various steps in FIG. 9 may overlap, occur in parallel, occur in a different order, or occur any number of times (including zero times).

It should be noted that the functions shown in or described with respect to FIGS. 2 through 9 can be implemented in an electronic device 101, server 106, or other device(s) in any suitable manner. For example, in some embodiments, at least some of the functions shown in or described with respect to FIGS. 2 through 9 can be implemented or supported using one or more software applications or other software instructions that are executed by the processor(s) 120 of the electronic device 101, server 106, or other device(s). In other embodiments, at least some of the functions shown in or described with respect to FIGS. 2 through 9 can be implemented or supported using one or more dedicated hardware components. In general, the functions shown in or described with respect to FIGS. 2 through 9 can be performed using any suitable hardware or any suitable combination of hardware and software/firmware instructions.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   obtaining, using at least one under display camera, one or more first image frames associated with a first diffraction pattern and one or more second image frames associated with a second diffraction pattern, the first diffraction pattern and the second diffraction pattern related through a transformation;

generating a first deblurred image using the one or more first image frames and a second deblurred image using the one or more second image frames; and combining the first and second deblurred images while exploiting complementary types of image artifacts created by the first and second diffraction patterns to generate an image of a scene.

2. The method of claim 1, wherein combining the first and second deblurred images comprises:

performing an alignment operation to generate aligned versions of the first and second deblurred images, the alignment operation exploiting the complementary types of image artifacts created by the first and second diffraction patterns; and merging the aligned versions of the first and second deblurred images.

3. The method of claim 2, wherein performing the alignment operation comprises at least one of:

performing a global registration operation in order to globally align the first deblurred image and the second deblurred image; and performing a local alignment operation in order to locally warp at least a portion of the first deblurred image and locally align portions of the first deblurred image and portions of the second deblurred image.

4. The method of claim 3, wherein at least one of:

the global registration operation comprises a feature extraction operation and a feature matching operation; and the local alignment operation comprises a non-rigid warping operation.

5. The method of claim 2, wherein merging the aligned versions of the first and second deblurred images comprises:

merging the aligned versions of the first and second deblurred images using at least one merging operation that is selected based on an image quality criterion, the image quality criterion able to vary within different portions of the first and second deblurred images.

6. The method of claim 5, wherein the at least one merging operation comprises at least one of:

an averaging operation that is selected when the image quality criterion specifies obtaining a higher signal-to-noise ratio;

a weighted averaging operation that is selected when the image quality criterion specifies obtaining a lower distortion, wherein weighting in the weighted averaging operation is based on local contrast; and a minimum operation that is selected when the image quality criterion specifies removing diffraction artifacts.

7. The method of claim 1, wherein:

the first diffraction pattern is associated with a first pattern of a display under which the at least one under display camera is positioned;

the second diffraction pattern is associated with a second pattern of the display; and the second diffraction pattern is obtained by at least one of:

rotating the at least one under display camera;

rotating at least a portion of the display relative to the at least one under display camera;

integrating different grid patterns into different portions of the display; and rotating an electronic device that includes the display and the at least one under display camera.

8. An electronic device comprising:

a display;

at least one under display camera positioned under the display; and at least one processor configured to:

obtain, using the at least one under display camera, one or more first image frames associated with a first diffraction pattern and one or more second image frames associated with a second diffraction pattern, the first diffraction pattern and the second diffraction pattern related through a transformation;

generate a first deblurred image using the one or more first image frames and a second deblurred image using the one or more second image frames; and combine the first and second deblurred images while exploiting complementary types of image artifacts created by the first and second diffraction patterns to generate an image of a scene.

9. The electronic device of claim 8, wherein, to combine the first and second deblurred images, the at least one processor is configured to:

perform an alignment operation to generate aligned versions of the first and second deblurred images, the alignment operation exploiting the complementary types of image artifacts created by the first and second diffraction patterns; and merge the aligned versions of the first and second deblurred images.

10. The electronic device of claim 9, wherein, to perform the alignment operation, the at least one processor is configured to at least one of:

perform a global registration operation in order to globally align the first deblurred image and the second deblurred image; and perform a local alignment operation in order to locally warp at least a portion of the first deblurred image and locally align portions of the first deblurred image and portions of the second deblurred image.

11. The electronic device of claim 10, wherein at least one of:

the global registration operation comprises a feature extraction operation and a feature matching operation; and the local alignment operation comprises a non-rigid warping operation.

12. The electronic device of claim 9, wherein, to merge the aligned versions of the first and second deblurred images, the at least one processor is configured to merge the aligned versions of the first and second deblurred images using at least one merging operation that is selected based on an image quality criterion, the image quality criterion able to vary within different portions of the first and second deblurred images.

13. The electronic device of claim 12, wherein the at least one merging operation comprises at least one of:

an averaging operation that is selected when the image quality criterion specifies obtaining a higher signal-to-noise ratio;

a weighted averaging operation that is selected when the image quality criterion specifies obtaining a lower distortion, wherein weighting in the weighted averaging operation is based on local contrast; and a minimum operation that is selected when the image quality criterion specifies removing diffraction artifacts.

14. The electronic device of claim 8, wherein:

the first diffraction pattern is associated with a first pattern of the display;

the second diffraction pattern is associated with a second pattern of the display; and the second diffraction pattern is obtained by at least one of:

rotation of the at least one under display camera;

rotation of at least a portion of the display relative to the at least one under display camera;

integration of different grid patterns into different portions of the display; and rotation of the electronic device.

15. A non-transitory machine readable medium containing instructions that when executed cause at least one processor of an electronic device to:

obtain, using at least one under display camera, one or more first image frames associated with a first diffraction pattern and one or more second image frames associated with a second diffraction pattern, the first diffraction pattern and the second diffraction pattern related through a transformation;

generate a first deblurred image using the one or more first image frames and a second deblurred image using the one or more second image frames; and combine the first and second deblurred images while exploiting complementary types of image artifacts created by the first and second diffraction patterns to generate an image of a scene.

16. The non-transitory machine readable medium of claim 15, wherein the instructions that when executed cause the at least one processor to combine the first and second deblurred images comprise:

instructions that when executed cause the at least one processor to:

perform an alignment operation to generate aligned versions of the first and second deblurred images, the alignment operation exploiting the complementary types of image artifacts created by the first and second diffraction patterns; and merge the aligned versions of the first and second deblurred images.

17. The non-transitory machine readable medium of claim 16, wherein the instructions that when executed cause the at least one processor to perform the alignment operation comprise:

instructions that when executed cause the at least one processor to at least one of:

perform a global registration operation in order to globally align the first deblurred image and the second deblurred image; and perform a local alignment operation in order to locally warp at least a portion of the first deblurred image and locally align portions of the first deblurred image and portions of the second deblurred image.

18. The non-transitory machine readable medium of claim 17, wherein at least one of:

the global registration operation comprises a feature extraction operation and a feature matching operation; and the local alignment operation comprises a non-rigid warping operation.

19. The non-transitory machine readable medium of claim 16, wherein the instructions that when executed cause the at least one processor to merge the aligned versions of the first and second deblurred images comprise:

instructions that when executed cause the at least one processor to merge the aligned versions of the first and second deblurred images using at least one merging operation that is selected based on an image quality criterion, the image quality criterion able to vary within different portions of the first and second deblurred images.

20. The non-transitory machine readable medium of claim 19, wherein the at least one merging operation comprises at least one of:

an averaging operation that is selected when the image quality criterion specifies obtaining a higher signal-to-noise ratio;

a weighted averaging operation that is selected when the image quality criterion specifies obtaining a lower distortion, wherein weighting in the weighted averaging operation is based on local contrast; and a minimum operation that is selected when the image quality criterion specifies removing diffraction artifacts.

* * * * *